(12) United States Patent
Liu et al.

(10) Patent No.: US 7,973,491 B2
(45) Date of Patent: Jul. 5, 2011

(54) MULTI-LAMP BACKLIGHT APPARATUS

(75) Inventors: Ming-Feng Liu, Taoyuan County (TW); Chao-Jung Lin, Bade (TW)

(73) Assignee: Darfon Electronics Corp., Gueishan, Taoyuan (TW)

( * ) Notice: Subject to any disclaimer, the term of this patent is extended or adjusted under 35 U.S.C. 154(b) by 442 days.

(21) Appl. No.: 12/263,744

(22) Filed: Nov. 3, 2008

(65) Prior Publication Data
US 2009/0121647 A1 May 14, 2009

(30) Foreign Application Priority Data

Nov. 14, 2007 (TW) .............................. 96142954 A

(51) Int. Cl.
*H05B 41/16* (2006.01)
*H05B 41/24* (2006.01)

(52) U.S. Cl. .......... 315/277; 315/276; 315/278; 363/25; 363/36; 363/98; 323/282; 323/280; 345/52; 345/102

(58) Field of Classification Search .......... 315/276–278, 315/209 R, 224, 220, 255, 307, 312, 325; 363/25, 36, 98, 56.08; 323/282, 280; 345/52, 345/102
See application file for complete search history.

(56) References Cited

U.S. PATENT DOCUMENTS

| | | | | |
|---|---|---|---|---|
| 5,548,226 A | * | 8/1996 | Takekuma et al. ............... | 326/30 |
| 5,650,757 A | * | 7/1997 | Barber ........................... | 333/128 |
| 5,821,798 A | * | 10/1998 | Tonn, Jr. ........................ | 327/333 |
| 5,831,467 A | * | 11/1998 | Leung et al. ................... | 327/319 |
| 5,945,886 A | * | 8/1999 | Millar ............................. | 333/1 |
| 6,026,456 A | * | 2/2000 | Ilkbahar ........................ | 710/100 |
| 6,347,367 B1 | * | 2/2002 | Dell et al. ...................... | 711/170 |
| 6,369,605 B1 | * | 4/2002 | Bonella et al. ................. | 326/30 |
| 6,425,097 B1 | * | 7/2002 | Elachkar et al. ............... | 714/43 |
| 6,587,896 B1 | * | 7/2003 | Baldwin et al. ................ | 710/13 |
| 6,633,178 B2 | * | 10/2003 | Wilcox et al. .................. | 326/30 |
| 6,636,069 B1 | * | 10/2003 | Muljono ........................ | 326/30 |
| 7,515,487 B2 | * | 4/2009 | Seo et al. ................. | 365/189.09 |
| 7,692,983 B2 | * | 4/2010 | Lee et al. ....................... | 365/198 |
| 7,716,401 B2 | * | 5/2010 | Lee ................................. | 710/100 |
| 2002/0118037 A1 | * | 8/2002 | Kim et al. ...................... | 326/30 |
| 2003/0020511 A1 | * | 1/2003 | Hirai et al. ..................... | 326/30 |
| 2003/0062966 A1 | * | 4/2003 | Abo et al. ...................... | 333/33 |
| 2003/0122575 A1 | * | 7/2003 | Jang et al. ...................... | 326/30 |
| 2003/0146775 A1 | * | 8/2003 | Levin et al. .................... | 326/30 |
| 2003/0189441 A1 | * | 10/2003 | Nguyen et al. ................. | 326/30 |
| 2003/0234664 A1 | * | 12/2003 | Yamagata ....................... | 326/30 |
| 2004/0196064 A1 | * | 10/2004 | Garlepp et al. ................. | 326/30 |
| 2004/0264267 A1 | * | 12/2004 | Nishio et al. ................... | 365/200 |
| 2005/0088200 A1 | * | 4/2005 | Takekuma et al. ............. | 326/30 |
| 2005/0127940 A1 | * | 6/2005 | Takekuma et al. ............. | 326/30 |
| 2005/0248362 A1 | * | 11/2005 | Choe ............................... | 326/30 |
| 2006/0001443 A1 | * | 1/2006 | Wang et al. .................... | 326/30 |

(Continued)

*Primary Examiner* — Shawki S Ismail
*Assistant Examiner* — Matthew C Tabler
(74) *Attorney, Agent, or Firm* — Winston Hsu; Scott Margo

(57) ABSTRACT

A multi-lamp backlight apparatus is disclosed. The multi-lamp backlight apparatus includes 2N lamps, N balancing transformers, and a high-voltage power source. N is a positive integer and k is an integer index ranging from 1 to N. The kth balancing transformer among the N balancing transformers includes a first primary winding, a second primary winding, and a secondary winding. The first primary winding connects in series with the (2k−1)th lamp of the 2N lamps. The second primary winding connects in series with the first primary winding and the (2k)th lamp. The secondary winding corresponds to the first primary winding and the second primary winding. The high-voltage power source is connected between the first primary windings and the second primary windings.

5 Claims, 6 Drawing Sheets

U.S. PATENT DOCUMENTS

| | | |
|---|---|---|
| 2006/0053243 A1* | 3/2006 | David et al. ............... 710/305 |
| 2006/0091900 A1* | 5/2006 | Kang et al. ............... 326/30 |
| 2006/0255829 A1* | 11/2006 | Kim et al. ............... 326/30 |
| 2007/0018683 A1* | 1/2007 | Takekuma et al. ............... 326/30 |
| 2007/0080707 A1* | 4/2007 | Brinkman et al. ............... 326/30 |
| 2007/0103190 A1* | 5/2007 | Kubo ............... 326/30 |
| 2007/0120499 A1* | 5/2007 | Shimura et al. ............... 315/277 |
| 2007/0126464 A1* | 6/2007 | Vergis et al. ............... 326/30 |

* cited by examiner

| Lamp number | 1 | 2 | 3 | 4 | 5 | 6 | 7 | 8 | 9 | 10 |
|---|---|---|---|---|---|---|---|---|---|---|
| Lamp current | 8.10 | 8.07 | 8.28 | 7.97 | 7.68 | 8.06 | 7.91 | 8.30 | 8.03 | 7.88 |
| Deviation to average (%) | 0.77 | 0.40 | 3.01 | -0.85 | -4.45 | 0.27 | -1.59 | 3.26 | -0.1 | -1.97 |
| Lamp number | 11 | 12 | 13 | 14 | 15 | 16 | 17 | 18 | 19 | 20 |
| Lamp current | 7.98 | 8.25 | 7.81 | 8.02 | 8.19 | 8.13 | 7.87 | 7.78 | 7.85 | 8.60 |
| Deviation to average (%) | -0.72 | 2.64 | -2.84 | -0.22 | 1.89 | 1.14 | -2.09 | -3.21 | -2.34 | 6.99 |

FIG. 4(A)

| Lamp number | 1 | 2 | 3 | 4 | 5 | 6 | 7 | 8 | 9 | 10 |
|---|---|---|---|---|---|---|---|---|---|---|
| Lamp current | 4.46 | 4.31 | 4.58 | 4.38 | 4.23 | 4.42 | 4.38 | 4.61 | 4.40 | 4.47 |
| Deviation to average (%) | 0.41 | -2.97 | 3.11 | -1.40 | -4.77 | -0.5 | -1.4 | 3.78 | -0.95 | 0.63 |
| Lamp number | 11 | 12 | 13 | 14 | 15 | 16 | 17 | 18 | 19 | 20 |
| Lamp current | 4.47 | 4.53 | 4.41 | 4.36 | 4.67 | 4.38 | 4.29 | 4.42 | 4.58 | 4.49 |
| Deviation to average (%) | 0.63 | 1.98 | -0.72 | -1.85 | 5.13 | -1.40 | -3.42 | -0.5 | 3.11 | 1.08 |

FIG. 4(B)

| Lamp number | 1 | 2 | 3 | 4 | 5 | 6 | 7 | 8 | 9 | 10 |
|---|---|---|---|---|---|---|---|---|---|---|
| Lamp current | 8.17 | 8.17 | 8.27 | 8.01 | 7.66 | 8.08 | 7.87 | 8.37 | 8.02 | 7.91 |
| Deviation to average (%) | 1.34 | 1.34 | 2.58 | -0.65 | -4.99 | 0.22 | -2.38 | 3.82 | -0.52 | -1.89 |
| Lamp number | 11 | 12 | 13 | 14 | 15 | 16 | 17 | 18 | 19 | 20 |
| Lamp current | 7.92 | 8.4 | 8.07 | 7.78 | 7.89 | 8.48 | 7.66 | 8.03 | 8 | 8.48 |
| Deviation to average (%) | -1.76 | 4.19 | 0.1 | -3.5 | -2.13 | 5.18 | -4.99 | -0.4 | -0.77 | 5.18 |

FIG. 6(A)

| Lamp number | 1 | 2 | 3 | 4 | 5 | 6 | 7 | 8 | 9 | 10 |
|---|---|---|---|---|---|---|---|---|---|---|
| Lamp current | 4.46 | 4.43 | 4.66 | 4.37 | 4.25 | 4.42 | 4.46 | 4.57 | 4.46 | 4.38 |
| Deviation to average (%) | 0.22 | -0.45 | 4.72 | -1.8 | -4.49 | -0.67 | 0.22 | 2.7 | 0.22 | -1.57 |
| Lamp number | 11 | 12 | 13 | 14 | 15 | 16 | 17 | 18 | 19 | 20 |
| Lamp current | 4.48 | 4.56 | 4.38 | 4.38 | 4.65 | 4.31 | 4.25 | 4.38 | 4.5 | 4.6 |
| Deviation to average (%) | 0.67 | 2.47 | -1.57 | -1.57 | 4.49 | -3.15 | -4.49 | -1.57 | 1.12 | 3.37 |

FIG. 6(B)

MULTI-LAMP BACKLIGHT APPARATUS

BACKGROUND OF THE INVENTION

1. Field of the Invention

The invention relates to a multi-lamp backlight apparatus, and more particularly, to a multi-lamp backlight apparatus using a balancing transformer to control two lamps.

2. Description of the Prior Art

In recent years, with the increase of the LCD panel size, the backlight apparatus comprising a plurality of cold cathode fluorescent lamps (CCFLs) is widely used to provide the high-quality light source for the LCD panel.

However, the most serious problem of the multi-lamp backlight apparatus is how to make the current of each lamp maintain approximately the same, so that the light source provided to the LCD panel can have stable and uniform lightness.

In order to solve the above-mentioned problems, a Jin balancer applied to the multi-lamp backlight apparatus is disclosed. FIG. 1 shows a schematic diagram of the multi-lamp backlight apparatus including a Jin balancer structure in prior art. As shown in FIG. 1, the multi-lamp backlight apparatus 1 comprises ten lamps 12. In the Jin balancer structure, one balancing transformer can only be connected to one lamp 12 in series. Therefore, the multi-lamp backlight apparatus 1 totally needs ten balancing transformer 2 to make the lamp currents flow to each of the lamps 12 with approximately the same volume.

Therefore, the invention provides a multi-lamp backlight apparatus to solve the above-mentioned problems.

SUMMARY OF THE INVENTION

The invention provides a multi-lamp backlight apparatus. A first embodiment according to the invention is a multi-lamp backlight apparatus. The multi-lamp backlight apparatus comprises 2N lamps, N balancing transformers, and a high-voltage power source. N is a positive integer.

The N balancing transformers are electrically connected to the 2N lamps. The kth balancing transformer among the N balancing transformers comprises a first primary winding, a second primary winding, and a secondary winding. k is an integer index ranging from 1 to N.

The first primary winding connects in series with the (2k−1)th lamp of the 2N lamps. The second primary winding connects in series with the first primary winding and the (2k)th lamp. The secondary winding corresponds to the first primary winding and the second primary winding. The N secondary windings of the N balancing transformers are connected in series to form a loop. The high-voltage power source is connected between the first primary windings and the second primary windings.

Another embodiment of the invention is also a multi-lamp backlight apparatus. The multi-lamp backlight apparatus comprises 2N lamps, N balancing transformers, and a high-voltage power source. N is a positive integer; k is an integer index ranging from 1 to N. The kth balancing transformer among the N balancing transformers comprises a primary winding and a secondary winding.

The primary winding connects in series with the (2k−1)th lamp and the (2k)th lamp of the 2N lamps. The secondary winding corresponds to the primary winding. The N secondary windings of the N balancing transformers are connected in series to form a loop. The high-voltage power source is electrically connected to the N primary windings of the N balancing transformers.

Compared to the prior art, the multi-lamp backlight apparatus according to the invention can control the lamp currents of two lamps via a balancing transformer, which not only enables the lamp currents to be balanced and obtains stable and uniform currents, but also simplifies the Jin balancer structure used in the multi-lamp backlight apparatus and reduces the number of the balancing transformer. Therefore, the cost of the multi-lamp backlight apparatus can be largely reduced.

The advantage and spirit of the invention may be further understood by the following recitations together with the appended drawings.

BRIEF DESCRIPTION OF THE APPENDED DRAWINGS

Figure 1:
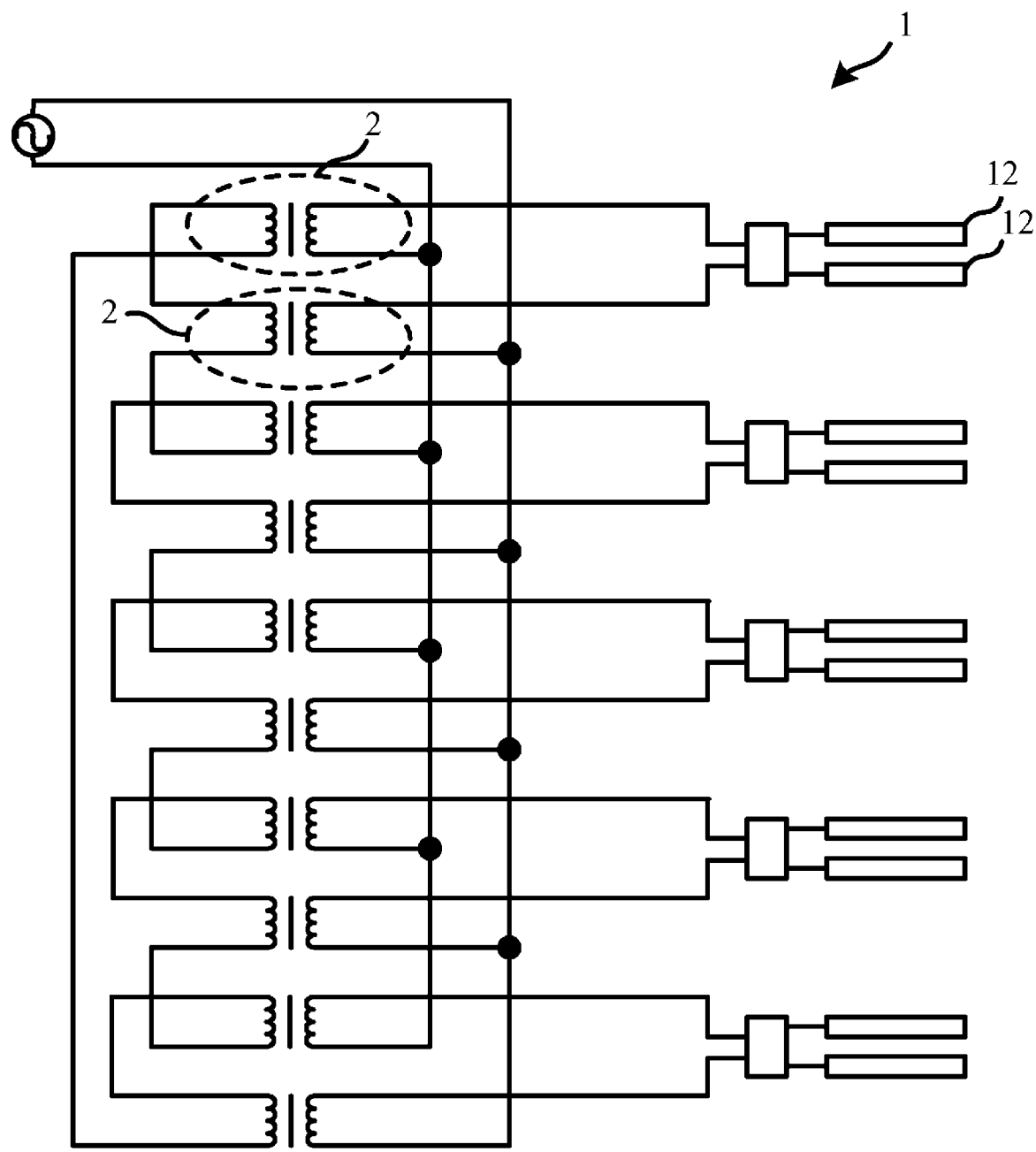
FIG. 1 shows a schematic diagram of the multi-lamp backlight apparatus including a Jin balancer structure in prior art.
Figure 2:
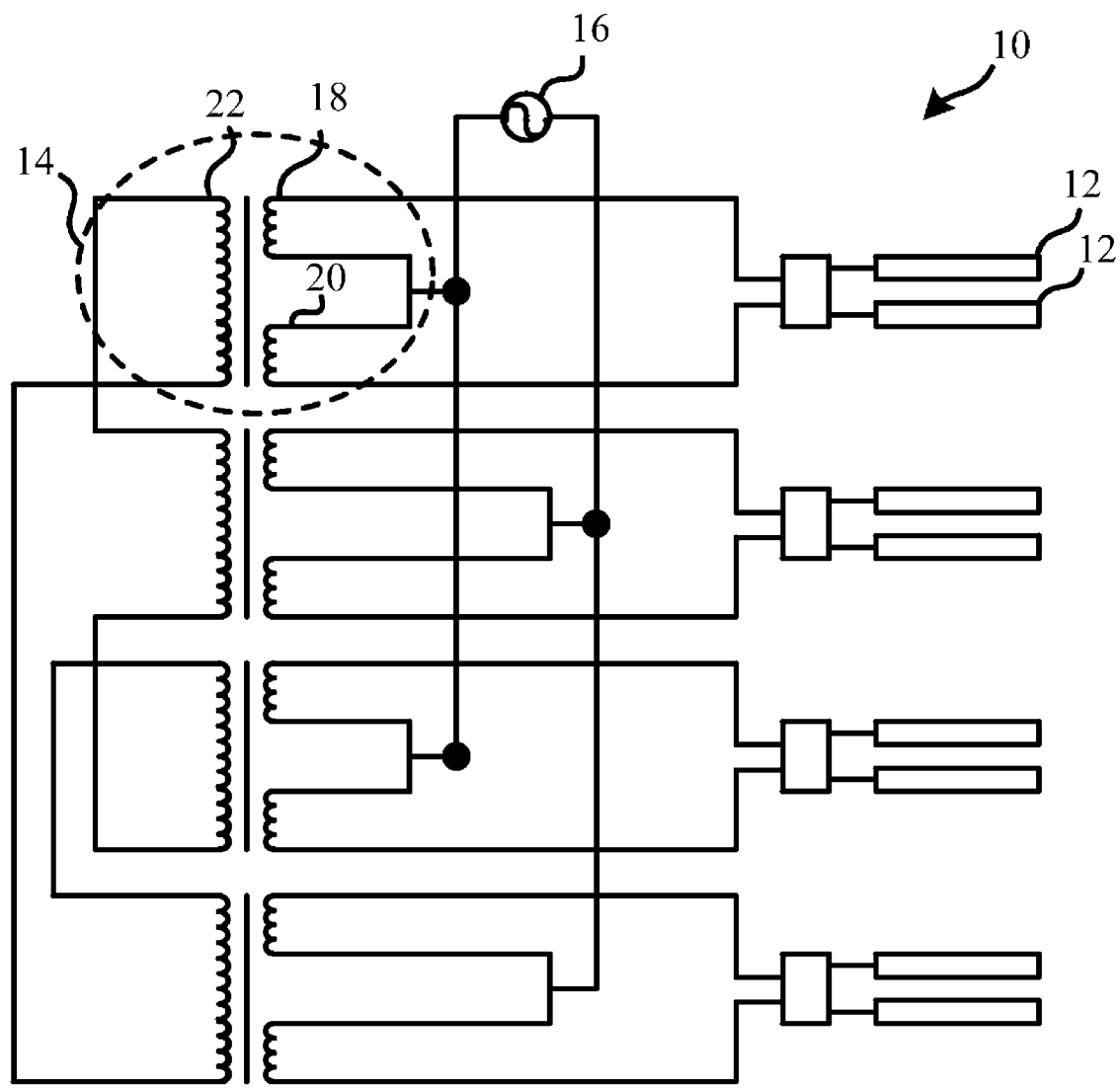
FIG. 2 shows a schematic diagram of the multi-lamp backlight apparatus according to the first embodiment of the invention.

FIG. 4(A) and FIG. 4(B) show the experimental data of the lamp current related to multi-lamp backlight apparatus shown in FIG. 2.

Figure 5:
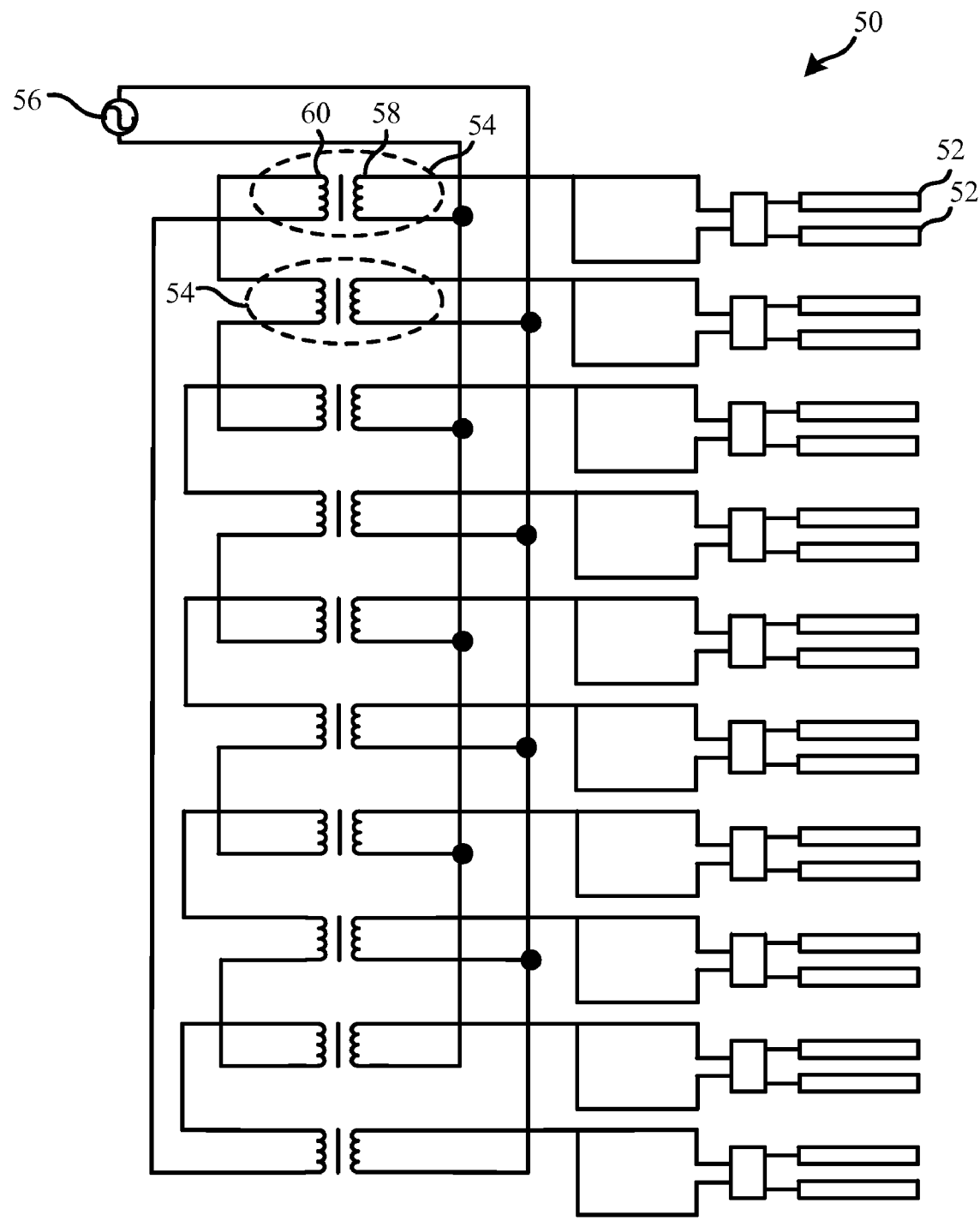

FIG. 5 shows a schematic diagram of the multi-lamp backlight apparatus according to the second embodiment of the invention.

FIG. 6(A) and FIG. 6(B) show the experimental data of the lamp current related to multi-lamp backlight apparatus shown in FIG. 5.

DETAILED DESCRIPTION OF THE INVENTION

A first embodiment according to the invention is a multi-lamp backlight apparatus. Please refer to FIG. 2. FIG. 2 shows a schematic diagram of the multi-lamp backlight apparatus according to the first embodiment of the invention. As shown in FIG. 2, the multi-lamp backlight apparatus 10 comprises 2N lamps 12, N balancing transformers 14, and a high-voltage power source 16. N is a positive integer. In this embodiment, N is assumed to be 5. Therefore, the multi-lamp backlight apparatus 10 shown in FIG. 2 totally comprises ten lamps 12, five balancing transformers, and one high-voltage power source 16.

In the above-mentioned multi-lamp backlight apparatus 10, the kth balancing transformer 14 among the N balancing transformers 14 comprises a first primary winding 18, a second primary winding 20, and a secondary winding 22. k is an integer index ranging from 1 to N.

The first primary winding 18 of the kth balancing transformer 14 connects in series with the (2k−1)th lamp 12 of the 2N lamps 12. The second primary winding 20 of the kth balancing transformer 14 connects in series with the first primary winding 18 and the (2k)th lamp 12 of the 2N lamps 12. The secondary winding 22 of the kth balancing transformer 14 corresponds to the first primary winding 18 and the second primary winding 20 of the kth balancing transformer 14.

Taking the multi-lamp backlight apparatus 10 shown in FIG. 2 as an example, as to the third balancing transformer 14, its first primary winding 18 is connected to the fifth lamp 12 in series; its second primary winding 20 is connected in series to not only its first primary winding 18, but also the sixth lamp 12; its secondary winding 22 corresponds to the first primary winding 18 and the second primary winding 20 of the same balancing transformer 14.

In addition, in the multi-lamp backlight apparatus 10, the N secondary windings 22 of the N balancing transformers 14 are connected in series to form a loop. Therefore, the current flowing through the loop of N secondary windings 22 should have a common current value. The high-voltage power source 16 is electrically connected between the first primary winding 18 and the second primary winding 20 of the Nth balancing transformers 14. Moreover, the loop formed by the N secondary windings 22 can couple to a feedback circuit (not shown in the figures). The feedback circuit can adjust the voltage value of the high-voltage power source 16 via the control circuit to make the current of the lamp 12 reach a default value.

In the same balancing transformer 14, the winding circle number of the first primary winding 18 and the second primary winding 20 is approximately the same with the winding circle number of the secondary winding 22.

Figure 3A:
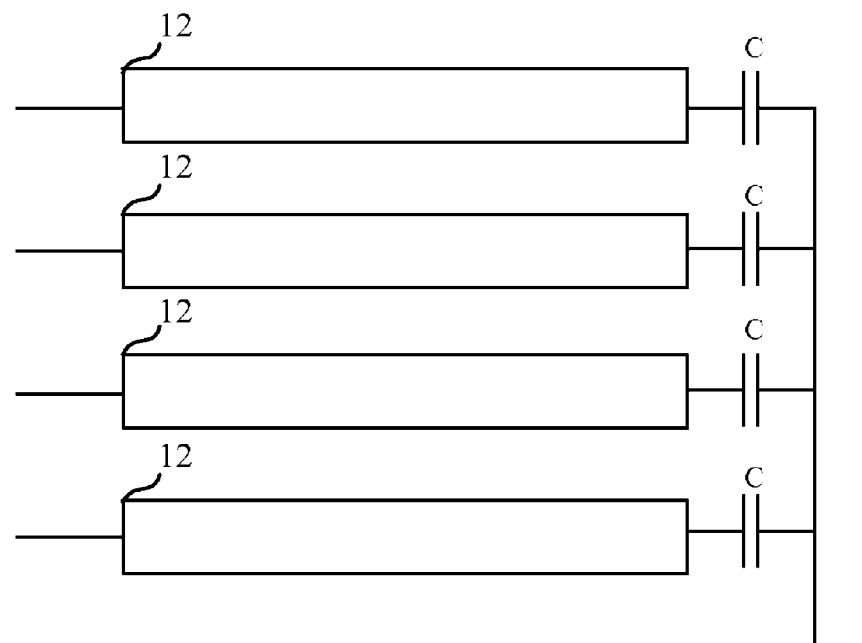
FIG. 3(A) shows a schematic diagram of the low-voltage end of the lamp connecting to a high-voltage capacitor.
Figure 3B:
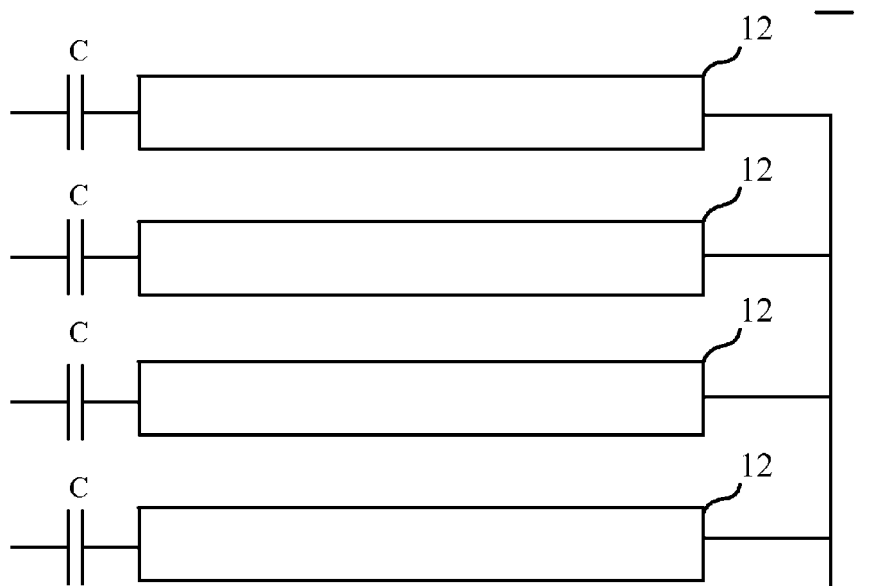
FIG. 3(B) shows a schematic diagram of the high-voltage end of the lamp connecting to a high-voltage capacitor.

In practical applications, an electrode end of each lamp can connect to a high-voltage capacitor in series. It has no limitation to which end of lamp is connected to the high-voltage capacitor in series. Thus, it can be a high-voltage end or a low-voltage end. FIG. 3(A) shows a schematic diagram of the low-voltage end of the lamp 12 connecting to a high-voltage capacitor C; FIG. 3(B) shows a schematic diagram of the high-voltage end of the lamp 12 connecting to a high-voltage capacitor C.

No matter if the high-voltage capacitor is connected to the high-voltage end or the low-voltage end of the lamp, its main purpose is to improve the reducing effect to the lamp current uniformity caused by the different resistance deviation in the circuit. If the resistance value of the first primary winding, the second primary winding, or the lamp itself is not very uniform, the deviation among the lamp currents will become larger. Thus, the balance of the lamp currents will be affected. In order to improve this situation, the high-voltage capacitor with small capacitance value can connect to one side of the lamp in series. By doing so, the different resistance deviation of the first primary winding, the second primary winding, or the lamp itself can be neglected, and the stable and uniform lamp currents can be obtained.

Please refer to FIG. 4(A) and FIG. 4(B). The tables in FIG. 4(A) and FIG. 4(B) show the experimental data related to the above-mentioned multi-lamp backlight apparatus 10. In this experiment, the multi-lamp backlight apparatus 10 according to the invention comprises twenty lamps. FIG. 4(A) shows the lamp current values of the twenty lamps and the deviation percentage between the lamp current value and the average value under the condition of 100% lamp lightness; FIG. 4(B) shows the lamp current values of the twenty lamps and the deviation percentage between the lamp current value and the average value under the condition of 30% lamp lightness.

As shown in FIG. 4(A) and FIG. 4(B), in the multi-lamp backlight apparatus 10, no matter if the lamp lightness is set as 100% or 30%, most of the deviations between the lamp current value and the average value of the lamps are smaller than 5%. Therefore, the multi-lamp backlight apparatus 10 according to the invention can provide stable and uniform lamp currents to the lamps.

A second embodiment according to the invention is also a multi-lamp backlight apparatus. Please refer to FIG. 5. FIG. 5 shows a schematic diagram of the multi-lamp backlight apparatus. As shown in FIG. 5, the multi-lamp backlight apparatus 50 comprises 2N lamps 52, N balancing transformers 54, and a high-voltage power source 56. N is positive integer. In this embodiment, it is assumed that N equals to 5, so the multi-lamp backlight apparatus 50 shown in FIG. 5 totally comprises ten lamps 52, five balancing transformers 54, and one high-voltage power source 56.

If k is an integer index ranging from 1 to N, the kth balancing transformer 54 among the N balancing transformers 54 comprises a primary winding 58 and a secondary winding 60. The primary winding 58 connects in series with the (2k−1)th lamp 52 and the (2k)th lamp 52 of the 2N lamps 52. The secondary winding 60 corresponds to the primary winding 58. The N secondary windings 60 of the N balancing transformers 54 are connected in series to form a loop. The high-voltage power source 56 is electrically connected to the N primary windings 58 of the N balancing transformers 54.

Taking the multi-lamp backlight apparatus 50 as an example, in the second balancing transformer 54, the primary winding 58 connects in series with the third lamp 52 and the fourth lamp 52; the secondary winding 60 corresponds to the primary winding 58.

In practical applications, each of the balancing transformers 54 comprises a winding circle ratio corresponding to the primary winding 58 and the secondary winding 60. Because the winding circle ratios of the balancing transformers 54 are approximately the same and the loop formed by all secondary windings 60 has a common current, the lamp currents provided to each lamp 52 will be approximately the same according to the energy conversation principle.

In addition, the multi-lamp backlight apparatus 50 can further comprise 2N high-voltage capacitors. Each of the 2N high-voltage capacitors can connect in series with one of the 2N lamps 52. In detail, the electrode end of the lamp 52 connecting in series with the high-voltage capacitor can be the high-voltage end of the lamp 52 or the low-voltage end of the lamp 52.

No matter if the high-voltage capacitor is connected to the high-voltage end or the low-voltage end of the lamp, its main purpose is to improve the reducing effect to the lamp current uniformity caused by the different resistance deviation in the circuit.

It should be noticed that a general Jin balancer corresponds to only one lamp, and its inductance value is about 600 to 800 mH, but the balancing transformer according to the invention can correspond to two lamps at the same time and have a larger inductance value (about 1.3H) than the Jin balancer. Because the inductance value of the balancing transformer relates to its winding circle number and size, the balancing transformer according to the invention has more winding circles and larger size.

Please refer to FIG. 6(A) and FIG. 6(B). The stables in FIG. 6(A) and FIG. 6(B) show the experimental data related to the above-mentioned multi-lamp backlight apparatus 50. In this experiment, the multi-lamp backlight apparatus 50 according to the invention comprises twenty lamps. FIG. 6(A) shows the lamp current values of the twenty lamps and the deviation percentage between the lamp current value and the average value under the condition of 100% lamp lightness; FIG. 6(B) shows the lamp current values of the twenty lamps and the deviation percentage between the lamp current value and the average value under the condition of 30% lamp lightness.

As shown in FIG. 6(A) and FIG. 6(B), in the multi-lamp backlight apparatus 50, no matter if the lamp lightness is set as 100% or 30%, most of the deviations between the lamp current value and the average value of the lamps are smaller than 5%. Therefore, the multi-lamp backlight apparatus 50 according to the invention can provide stable and uniform lamp currents to the lamps.

Compared to the prior art, the multi-lamp backlight apparatus according to the invention can control the lamp currents of two lamps via a balancing transformer, which not only enables the lamp currents to be balanced and obtains stable and uniform currents, but also simplifies the Jin balancer structure used in the multi-lamp backlight apparatus and reduces the number of the balancing transformer. Therefore, the cost of the multi-lamp backlight apparatus can be largely reduced.

With the recitations of the preferred embodiment above, the features and spirits of the invention will be hopefully well described. However, the scope of the invention is not restricted by the preferred embodiment disclosed above. The objective is that all alternative and equivalent arrangements are hopefully covered in the scope of the appended claims of the invention. Accordingly, the above disclosure should be construed as limited only by the metes and bounds of the appended claims.

What is claimed is:

1. A multi-lamp backlight apparatus, comprising:
   2N lamps, N being a positive integer;
   N balancing transformers electrically connected to the 2N lamps, k being an integer index ranging from 1 to N, the kth balancing transformer among the N balancing transformers comprising:
   a first primary winding connecting in series with the (2k−1)th lamp of the 2N lamps;
   a second primary winding connecting in series between the first primary winding and the (2k)th lamp; and
   a secondary winding corresponding to the first primary winding and the second primary winding, the N secondary windings of the N balancing transformers connecting in series to form a loop; and
   a high-voltage power source electrically connected between the first primary winding and the second primary winding of the Nth balancing transformer.

2. The multi-lamp backlight apparatus of claim 1, wherein the winding circle number of the first primary winding and the second primary winding is approximately the same with the winding circle number of the secondary winding.

3. The multi-lamp backlight apparatus of claim 1, wherein an electrode end of each lamp is connected to a high-voltage capacitor in series.

4. The multi-lamp backlight apparatus of claim 1, wherein the first primary winding is connected between the (2k−1)th lamp and the high-voltage power source.

5. The multi-lamp backlight apparatus of claim 1, wherein the second primary winding is connected between the (2k)th lamp and the high-voltage power source.

* * * * *